May 23, 1972 M. H. NORMAN ET AL 3,664,597
BRAKING DEVICE FOR A TAPE DISPENSER
Filed May 11, 1970 2 Sheets-Sheet 1
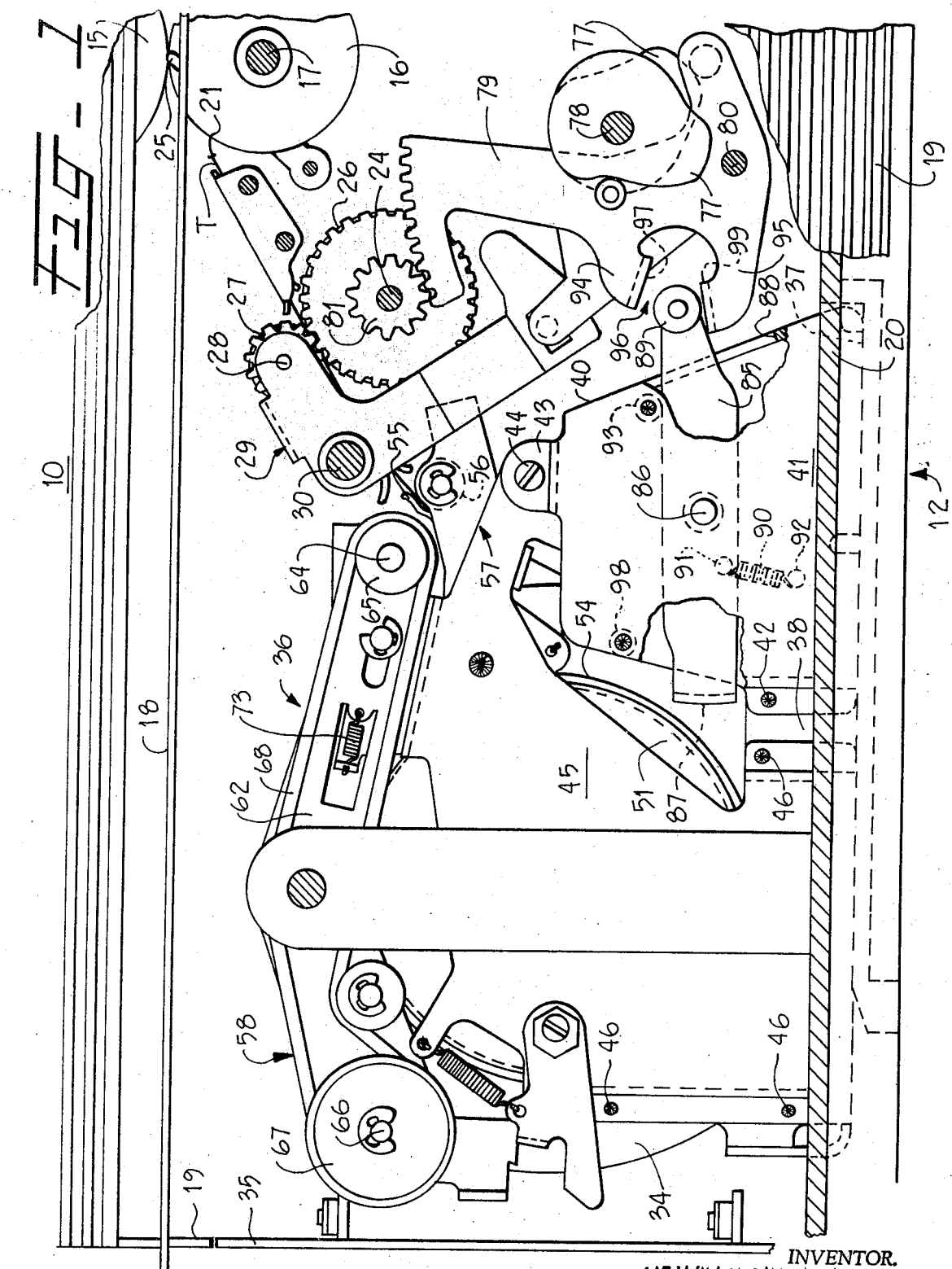
INVENTOR.
MELVIN H. NORMAN
NATHANIEL F. HAWTHORNE
BY

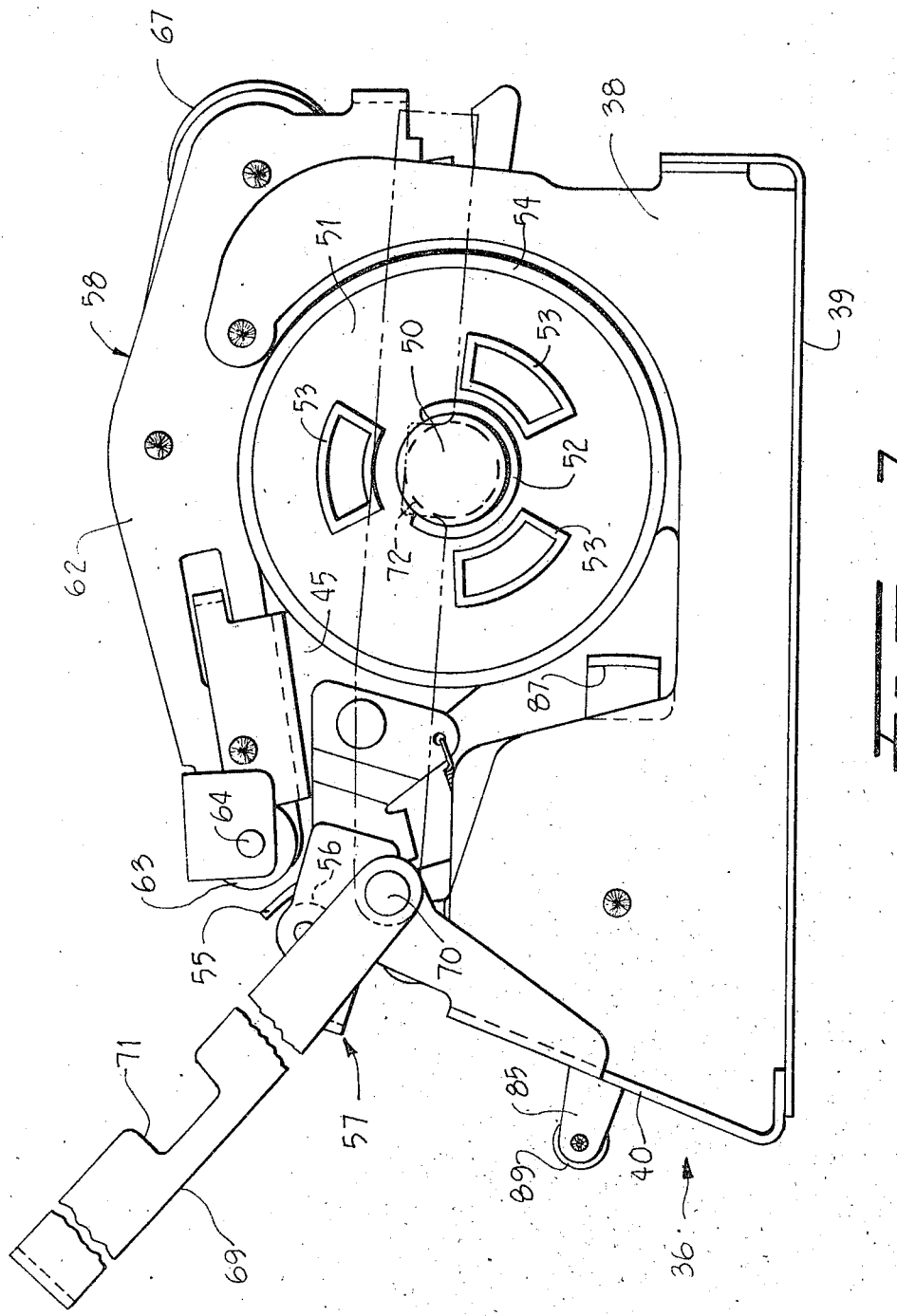

United States Patent Office 3,664,597
Patented May 23, 1972

3,664,597
BRAKING DEVICE FOR A TAPE DISPENSER

Melvin H. Norman, Oakland, and Nathaniel F. Hawthorne, Alameda, Calif., assignors to The Singer Company, New York, N.Y.
Filed May 11, 1970, Ser. No. 36,330
Int. Cl. B65h 23/06
U.S. Cl. 242—75.4                    3 Claims

ABSTRACT OF THE DISCLOSURE

In a tape feed mechanism, a brake is provided for terminating the rotation of the tape supply roll immediately following advancement of the tape. Normally, the brake is spring-biased to an inoperative position and is moved to the operative, or braking, position under the control of the tape feed drive means whereby overrunning of the supply roll is prevented.

BACKGROUND OF THE INVENTION

Field of the invention

This invention relates to tape feed mechanisms, and more particularly to a tape feed mechanism wherein the tape feed drive means operates a brake that prevents overrunning of the tape.

Description of prior art

In most systems now in use, a tape supply roll is supported in a suitable compartment within the cover of the machine. From the supply roll the tape is directed into a guide system and is advanced by a pair of coacting feed rollers to a printing station and then further to a cutting station, wherein the tape is severed, to provide a printed strip. Thereafter, the leading end of the tape is retracted to an "at rest" position for a succeeding tape printing operation. At the conclusion of the advancement of the tape by the feed rollers, the tape roll overruns due to inertia and the excessive unreeled tape accumulates in the tape roll housing, most often entangled.

SUMMARY OF THE INVENTION

According to the present invention, a tape supply roll is rotatably supported in a framework and during each operation a power-driven means controls the advancement of the tape a predetermined distance from said supply roll. As the advancement of the tape by the power driven means is concluded, the same means immediately effects operation of a braking means to prevent further rotation of said supply roll. More specifically, the braking means includes a disc connectible to the tape roll for rotation therewith. Immediately following advancement of the tape a given distance, the power driven means causes a lever to frictionally engage the periphery of said disc to prevent rotation of the tape supply roll.

DESCRIPTION OF THE DRAWINGS

FIG. 1 is a fragmentary sectional elevational view of a postage metering machine, showing the tape feed mechanism with the cartridge and tape supply roll in operative posiiton; and FIG. 2 is an elevational view of the tape roll cartridge with the tape roll removed to show the disc which is connectible therewith.

DESCRIPTION OF THE PREFERRED EMBODIMENT

The invention is shown as preferably embodied in a postage metering machine of the type described in the copending application of Mel E. Kinney et al., Ser. No. 795,471, filed Jan. 31, 1969, now U.S. Pat. No. 3,556,001.

Such a machine comprises a postage meter unit, a portion of which is shown at 10 in FIG. 1, and a base unit partially shown at 12. The meter unit 10 is adapted to support a rotary printing drum 15 and is detachably mounted on the base unit 12. Once the meter unit 10 is secured in place on the base unit 12, the print drum 15 is positioned for cooperation with an impression roller 16 secured on a shaft 17 suitably rotatably supported within the framework of the machine.

At its top, the base unit 12 is covered by a feed table 18 upon which envelopes are moved into print position with respect to the print drum 15 and is also enclosed by a suitable cover 19 secured to base plate 20. Within the base unit 12 is secured a drive mechanism (not shown) for continuously rotating impression roller 16 and which, together with a cyclically operable clutch, controls the cyclic rotations of the print drum 15.

For a tape printing operation, as disclosed in the aforementioned application, Ser. No. 795,471, the leading end of the tape T is moved from the normal "at rest" position indicated at 21 (FIG. 1) into engagement with a trip arm 25 which is effective to initiate a cycle of rotation of print drum 15. Thereafter, the tape is moved or advanced by the print drum 15. During the printing phase of the operation, the leading end portion of the tape is moved to a posiiton wherein the printed portion is severed, forming a strip which is thereafter dispensed. Following the severance of the tape, the remaining portion is retracted to return the now-leading end of the tape to the "at rest" position 21.

A movement of the tape T, i.e., the advancement and retraction thereof, is under control of a feed roller 26. In order to control the alternate advancement and retraction of the tape T, a pressure roller 27 is moved into and out of engagement with the feed roller 26. Pressure roller 27 is secured on a shaft 28, supported in a bail, generally indicated at 29, which is rockably mounted on a shaft 30. Normally, the bail 29 is in its clockwise rocked position, as seen in FIG. 1, with the tape T frictionally engaged between the pressure roller 27 and feed roller 26, to retain the leading end of the tape in the "at rest" position 21 and to thereafter effect the advancement of the tape.

During a tape printing operation, the tape T is withdrawn from a tape roll supply 34, which supply, when depleted, may be replaced by opening an access door 35 provided in the enclosing cover 19 of the base unit 12. In order to install a new supply roll of tape in the machine, a tape roll cartridge, generally indicated at 36 (FIGS. 1 and 2), is moved into position within a guide trough or channel 37 formed in the base plate 20.

The cartridge 36 comprises a sidewall 38 (FIG. 2) integrally formed at a right angle to a base portion 39 and, at its left end, as viewed in FIG. 2, abuts an end wall 40. The end wall 40 is preferably welded or may be otherwise secured to the press portion 39 and is formed as an integral part of an auxiliary side frame 41 which is riveted or otherwise secured at 42, to side wall 38 (FIG. 1). At its top edge, the auxiliary side frame 41 is provided with an offset ear or tab 43 which is secured by means of a screw 44, to an extended arm of an auxiliary side frame member 45. The auxiliary side frame member 41 is spaced from and is parallel with the side wall 38 to provide a covered area for certain operating mechanisms, as will be hereinafter described. Likewise, the auxiliary side frame member 45 is riveted or spot-welded at 46 to side wall 38. Auxiliary side frame member 45 provides a support for a spindle 50 projecting laterally therefrom, the side frame being spaced from and parallel to side wall 38, forming a recess in which a disc 51 carried by spindle 50 is freely rotatable. Disc 51 is positioned on the spindle 50 adjacent the inner wall of the auxiliary side frame member 45 and is retained in place against axial movement on spindle 50 by means of a clip 52 engaged in a suitable annular groove in the spindle. Integrally formed on the face of the disc 51 are three similar arcuate bosses 53 equiangularly spaced thereon and adapted to engage in complementary openings within the core of the tape roll 34. Thus, the disc 51 will rotate with the tape supply roll during each tape feed operation. Within a groove in the periphery of the disc 51 a tire 54 is secured, the tire 54 being of a pliable material, such as rubber, and having a circular cross-section.

The tape roll cartridge per se forms no part of the present invention and is, therefore, described only briefly. For a complete description of the tape roll cartridge reference is to be had to a copending application of Melvin H. Norman et al., Ser. No. 11,625 filed Feb. 16, 1970, now U.S. Pat. No. 3,625,407.

Following the emplacement of a roll of tape 34 on the spindle 50, the leading end of the tape is directed upwardly between an arcuate guide plate 55 and a pressure roller 56, each of which is supported within the U-shaped bracket or bail, generally indicated at 57 (FIGS. 1 and 2). Once the tape is in position between the guide plate 55 and pressure roller 56, a manually controlled tape feed mechanism, generally indicated at 58 and of well-known construction, is brought into play to continue the movement of the tape through its guide system. Thence, between feed roller 26 and pressure roller 27 to the "at rest" position 21, shown in FIG. 1, the separation of these rollers being under the control of the door 35 as described in application Ser. No. 795,471. For this purpose, a slide bar 62 is moved to the right in FIG. 1 to move a pair of similar rollers 63 (FIG. 2) into engagement with tape T to maintain the tape in frictional contact with the pressure roller 56. The rollers 63 are secured on a shaft 64 journalled in the slide bar 62 which shaft, at its outer end, carries a grooved pulley 65. At its other end, the slide bar 62 carries a pin 66 and a feed reel 67 rotatable thereon. A grooved pulley is integrally formed on and is coaxial with the feed wheel 67. An O ring belt 68 passes over the grooved pulley 65 and the second grooved pulley integrally formed on the feed wheel 67. With the rollers 63 in frictional engagement with the tape, manual rotation of the feed wheel 67 is effective to thread the tape in its guided path to the "at rest" position 21. The manual tape feed mechanism is of well-known construction and, therefore, is only briefly described herein. For a more complete description, reference is to be had to the aforementioned copending application Ser. No. 11,625.

It will be noted that the tape roll 34 is retained in position on the spindle 50 by means of a latch arm 69 (FIG. 2). Once the tape roll is in place on the spindle 50, the latch arm 69 is rocked clockwise about a pivot 70 to the position shown in phantom line in FIG. 2, wherein the edges of a notch 71 engage in a suitable annular groove 72 in the spindle 50.

Following the threading of the leading end portion of the tape T to the "start" or "at rest" position 21 by the manual feed wheel 67, slide bar 62 is released to the influence of spring 73 for movement of the slide bar to the inoperative position shown in FIG. 1. Thereafter, a pair of complementary cams 77, secured on a drive shaft 78, become effective in a well-known manner to impart an initial counter-clockwise rotation to a gear sector 79 about shaft 80, the teeth of the sector 79 being enmeshed with a pinion 81 carried by feed roller 26 coaxial therewith. Following the control of the advancement of the tape by this motion of the sector 79, the cams 77 become effective, during the single cycle of rotation of the shaft 78, to restore the sector 79 in a clockwise direction, thereby retracting the leading end of the tape to the "at rest" position 21, shown in FIG. 1. During the counter-clockwise rocking of the sector 79 for the advancement of the tape by the feed roll 26, the tape supply roll 34, together with the disc 51, rotates freely on the spindle 50.

At the conclusion of the withdrawal of the tape from the tape supply roll 34, the tape roll and disc 51, if not *restrained*, would tend to overrun or coast, due to inertia, causing the tape to loosen about the roll and become crumpled or entangled within the tape cartridge 36. Therefore, immediately following the advancement of the tape through the print station and the cutting station, rotation of the tape supply roll 34 and disc 51 is terminated. For this purpose, a brake lever arm 85 is rockably supported, intermediate its ends, on a shaft 86 secured at one end in side wall 38 and having its other end projecting through an aperture in auxiliary side frame 41. Lever arm 85 is disposed between side wall 38 and auxiliary side frame member 41, having its one end 87 arcuately formed and projecting laterally to provide a brake shoe for frictional engagement with the tire 54 on the disc 51. At its other end, the lever arm 85 extends through a suitable slot 88 in the end wall 40 of the tape roll cartridge 36 and, at its extremity, carries a roller 89. Normally, the lever arm 85 is resiliently retained by means of a spring 90 in the counter-clockwise rocked position shown in FIG. 1. At its one end, the spring 90 is supported on a pin 91 secured on the lever 85 and, at its other end, is supported on a pin 92 secured on side wall 38, the spring serving to resiliently retain the top edge of the lever 85 against a limit pin 93 carried by the auxiliary side frame member 41.

In order to control the rocking movement of the brake lever 85, gear sector 79 is provided with a pair of spaced arms 94 and 95 forming a yoke 96. As the gear sector 79 nears the end of its counter-clockwise rocking motion for the advancement of the tape T during a tape printing cycle of operation, an ear 97 formed at a right angle to the arm 94 of the gear sector, engages the roller 89 to impart a clockwise motion to the brake lever 85. As the brake shoe 87 moves into frictional engagement with the tire 54 on the disc 51, during the final angular rocking motion of the gear sector 79, a slight angular rotation is imparted to the tape supply roll 34 in the direction of movement of the tape. Such rotation serves to provide sufficient tape to be taken up by the feed roll 26, during the last part of the rocking motion of the gear sector 79. Thereupon, further rotation of the tape supply roll 34 is terminated as a result of the wedging of the brake shoe 87 with the tire 54 on the disc 51. The extent of the clockwise motion of the brake lever 85 is determined by the engagement of the top edge thereof with a resilient limit pin 98, secured on auxiliary side frame member 41.

After a short dwell, the cams 77, in completing their cycle of rotation, effect a return stroke of the gear sector 79 in a clockwise direction to retract the leading end of the tape to the "at rest" position shown at 21 (FIG. 1). Normally, the spring 90 serves to bias the brake lever 85 counter-clockwise to the inactive position shown in FIG. 1. However, if, for any reason, the arcuate shoe 87 should remain in frictional contact with the tire 54 on the disc 51, following its engagement therewith and against the influence of the spring 90, an ear 99 formed at a right angle to the yoke arm 95 will engage the roller 89 near the end of the clockwise rocking motion of the gear sector 79. Upon the engagement of the ear 99 with the roller 89, the shoe 87 is then freed from the tire 54 and the spring 90 is immediately effective to return the brake lever 85 to its inactive position. At this time, the tape printing cycle is completed and all parts return to their normally inoperative position.

What is claimed is:

1. In a tape printing device including: a framework, a tape supply roll, a spindle mounted in said framework for rotatably supporting said tape supply roll, a driven roller and a pressure roller having peripheral engagement with the tape positioned therebetween, a drive means for imparting rotation to said driven roller in one direction to advance the tape from said supply roll to a printing station, and in the other direction to retract the leading end of the tape to its "at rest" position, and a braking mechanism for stopping rotation of said tape supply roll following the advancement of the tape by said drive means, the combination comprising:

a disc rotatably supported on said spindle connectible with said tape supply roll for rotation therewith, a brake means controlled by said drive means for movement from a normally inactive position to an active position to frictionally engage said disc whereby rotation of said supply roll is terminated following advancement of the tape, said brake means comprising:

a lever arm rockably mounted intermediate its ends in said framework and in the rotational plane of said disc, said lever arm having an arcuately formed end portion operable upon rocking movement of said lever to an active position to frictionally engage the periphery of said disc to prevent overrun of said tape suply roll, a resilient means normally biasing said lever arm to an inactive position, and a roller carried by said lever arm for engagement by said drive means to rock said lever arm to the active position at the conclusion of the advancement of the tape, said drive means being operable to move said brake means to the inactive position subsequent to the retraction of said tape thereby releasing said supply roll.

2. In a device of the character described in claim 1 wherein said disc includes a peripheral rubber tire for frictional engagement by the arcuate formed end portion of said lever arm to prevent overrun of said tape supply roll.

3. In a device of the character described in claim 1 wherein said drive means comprises:

a pinion carried by said driven roller, a gear sector meshed with said pinion and rockable to and fro to impart rotation to said driven roller in said one direction and said other direction for controlling the advancement and retraction of the tape, said gear sector having a yoke portion, one arm of said yoke engaging said roller to rock said lever arm to the active position following rotation of said driven roller in said one direction and the other arm of said yoke engaging said roller to enable the rocking of said lever arm to the inactive position subsequent to the rotation of said driven roller in said other direction, and a power operated means for controlling the rocking movement of said gear sector.

References Cited
UNITED STATES PATENTS

| | | | |
|---|---|---|---|
| 1,907,760 | 5/1933 | Egger | 242—75.4 X |
| 3,556,001 | 1/1971 | Kinney et al. | 101—92 |
| 2,599,942 | 6/1952 | Roen | 242—75.4 X |
| 3,147,139 | 9/1964 | Eisenberg | 226—127 X |
| 2,754,115 | 7/1956 | Krueger | 226—133 X |

STANLEY N. GILREATH, Primary Examiner

G. A. WALTERS, Assistant Examiner